J. E. TAYLOR.
FLY TRAP.
APPLICATION FILED AUG. 23, 1915.
1,258,962.
Patented Mar. 12, 1918.
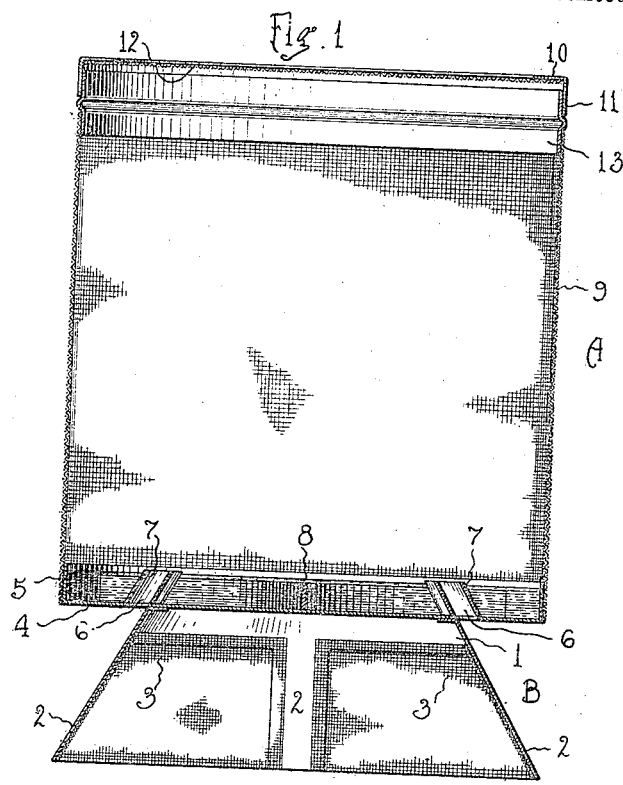
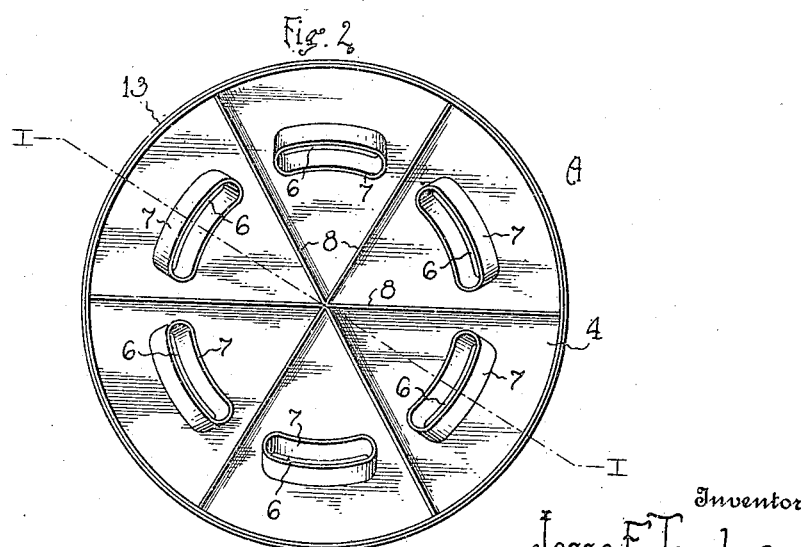
Witnesses
Arthur F. Draper
Chas. W. Stauffiger
Inventor
Jesse E. Taylor
By
Attorneys

UNITED STATES PATENT OFFICE.

JESSE E. TAYLOR, OF CROSWELL, MICHIGAN.

FLY-TRAP.

1,258,962. Specification of Letters Patent. Patented Mar. 12, 1918.

Application filed August 23, 1915. Serial No. 46,782.

*To all whom it may concern:*

Be it known that I, JESSE E. TAYLOR, a citizen of the United States of America, residing at Croswell, in the county of Sanilac and State of Michigan, have invented certain new and useful Improvements in Fly-Traps, of which the following is a specification, reference being had therein to the accompanying drawings.

This invention relates to fly traps, and the primary object of my invention is to provide a novel trap which may be made of a small size suitable for household purposes, or constructed upon a large scale and utilized by municipalities, in parks, alleys and other places to exterminate flies and similar insects.

It is also an object of the invention to provide means for holding water or other fluid so that the entrance openings of the trap will be surrounded thereby and prevent the flies from crawling across to said openings from the walls or other parts of the trap upon which they may light, and to arrange an inclined wall leading directly into the entrance openings for directing the flies into the trap.

A further object of my invention is to provide a simple, durable and inexpensive fly trap that can be maintained in a sanitary condition and easily baited.

The above and other objects are attained by a mechanical construction that will be hereinafter specifically described and then claimed, reference being had to the accompanying drawing, wherein—

Figure 1 is a vertical section on the line I—I of Fig. 2 of a fly trap embodying the invention, and Fig. 2 is a sectional plan view of the same.

A trap in accordance with this invention comprises an upper cage or receptacle generally designated A and a lower open base chamber or bait receptacle generally designated B, the former being supported by the latter. The base B comprises an open frame 1 provided with leg-like supports 2 of sufficient strength to support the weight of the structure and the open spaces between the legs are covered by a wire gauze or netting 3 to form a continuous wall of conical form. Any suitable bait to attract the flies to this wall may be placed within the chamber thus formed in the base.

The cage A comprises a sheet metal bottom 4 having an upstanding peripheral flange or wall 5 to form a pan or receptacle for water or other fluid which is secured to the base B and has a series of entrance openings 6 in the bottom provided with marginal upstanding flanges 7 extending upward to substantially the plane of the upper edge of the rim or side wall 5 of the pan to prevent the water from flowing out through the openings. The flanges 7 are preferably set at substantially the same inclination as the inclination of the wall of the conical base B with that portion of the flanges which extend along the inner sides of the entrance openings, in alinement with the inclined wall of the base and forming a continuation thereof so that flies which light upon the wall will crawl up the same directly into the entrance openings and through the same upon the inclined side flange 7 of the openings which form a continuation of said base wall.

The pan which forms the bottom of the cage A is preferably filled with water or other suitable liquid to near the upper edges of the flanges 7 to prevent the flies from crawling across the bottom and out through the entrance openings after they have once entered the cage, and to prevent the water from slopping in the pan when the trap is moved, radial ribs or partitions 8 are provided on the bottom 4 between the several entrance openings extending from the rim 5 of the pan to its center. These partitions are preferably of lesser height than the flanges 7 or rim 5 so that they will be submerged in the water, thus preventing the flies from lighting thereon.

The vertical wall of the upper cage A is preferably made of non-corrodible wire netting 9 of fine mesh or gauze which provides a foraminous circular side wall for the cage of sufficient strength to support a detachable cover 10 comprising a sheet metal flange 11 and center portion 12 of wire netting, said flange being adapted to engage over a sheet metal rim 13 in the upper edge of the foraminous wall 9. The removable cover gives ready access to the interior of the cage for removing the flies or replenishing the water in the pan, all parts of the cage being thus very accessible.

The fly trap in its entirety can be made of light and durable metal, and as shown, it is preferable to make the cage A and base B circular in plan view, although these parts may be of any desired shape and size.

A suitable bait may be used to entice flies to the inclined wall of the base by placing it within the chamber formed by the base and if found desirable the pan may also be filled with a fluid which will attract flies. If water is used in the pan, it may be replenished by simply immersing the trap, which act will at the same time drown the insects and clean the trap.

One embodiment of my invention has been illustrated but it is to be understood that the structural elements are susceptible to such variations and modifications as fall within the scope of the appended claims.

What I claim is:—

1. In a fly trap, the combination of a cage, a pan forming the bottom of said cage and coextensive therewith, said pan having a plurality of separate entrance openings in its bottom, a flange on the pan bottom surrounding each opening at the edge thereof with the upper edges of said flanges substantially in the horizontal plane of the upper edge of the pan, said pan being adapted to hold a liquid to form a shallow pool having an area coextensive with the cage, and said flanges forming separate entrance passages opening through the surface of the pool, and a base for supporting said pan and providing a wall leading to said entrance openings.

2. In a fly trap, the combination of a cage, a pan forming the bottom of said cage and coextensive therewith, said pan having a plurality of separate entrance openings in its bottom, a base supporting said pan having a reticulated upwardly and inwardly inclined wall leading to the inner sides of said entrance openings and forming a bait receptacle, and flanges on the pan bottom surrounding said entrance openings and extending upwardly to substantially the horizontal plane of the upper edge of the pan, said flanges being inclined to correspond with the inclination of the wall of the base with the flange portion at the inner side of each opening forming a continuation of the said wall of the base to provide continuous run-ways through the entrance openings.

In testimony whereof I affix my signature in presence of two witnesses.

JESSE E. TAYLOR.

Witnesses:
ANNA M. DORR,
G. E. McGRANN.

Copies of this patent may be obtained for five cents each, by addressing the "Commissioner of Patents, Washington, D. C."